No. 856,317. PATENTED JUNE 11, 1907.
E. TOWLSON.
ROTARY MOTOR.
APPLICATION FILED JAN. 2, 1907.
2 SHEETS—SHEET 1.
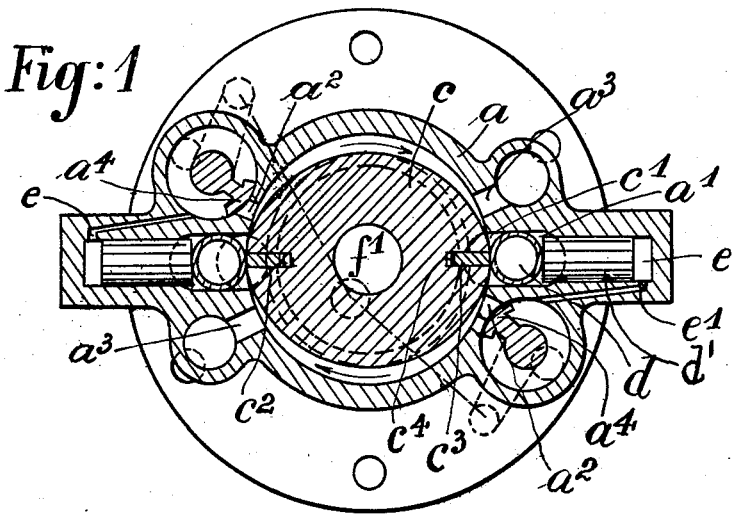
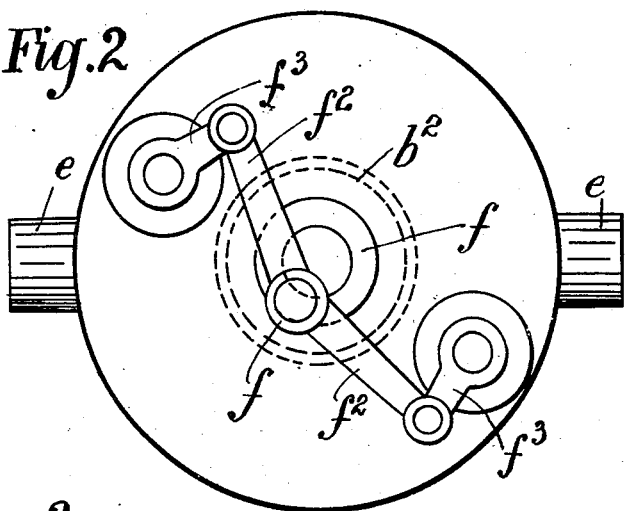
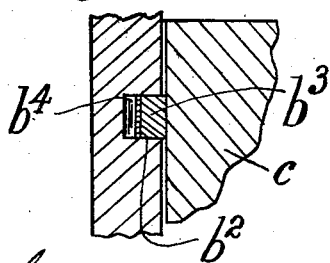
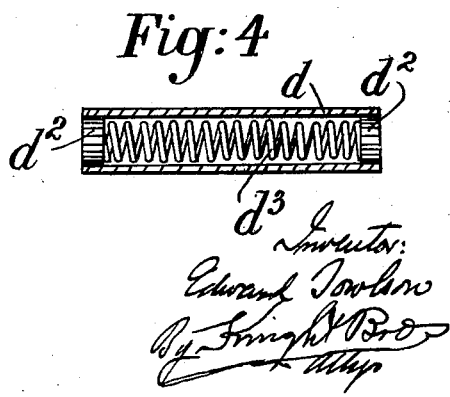

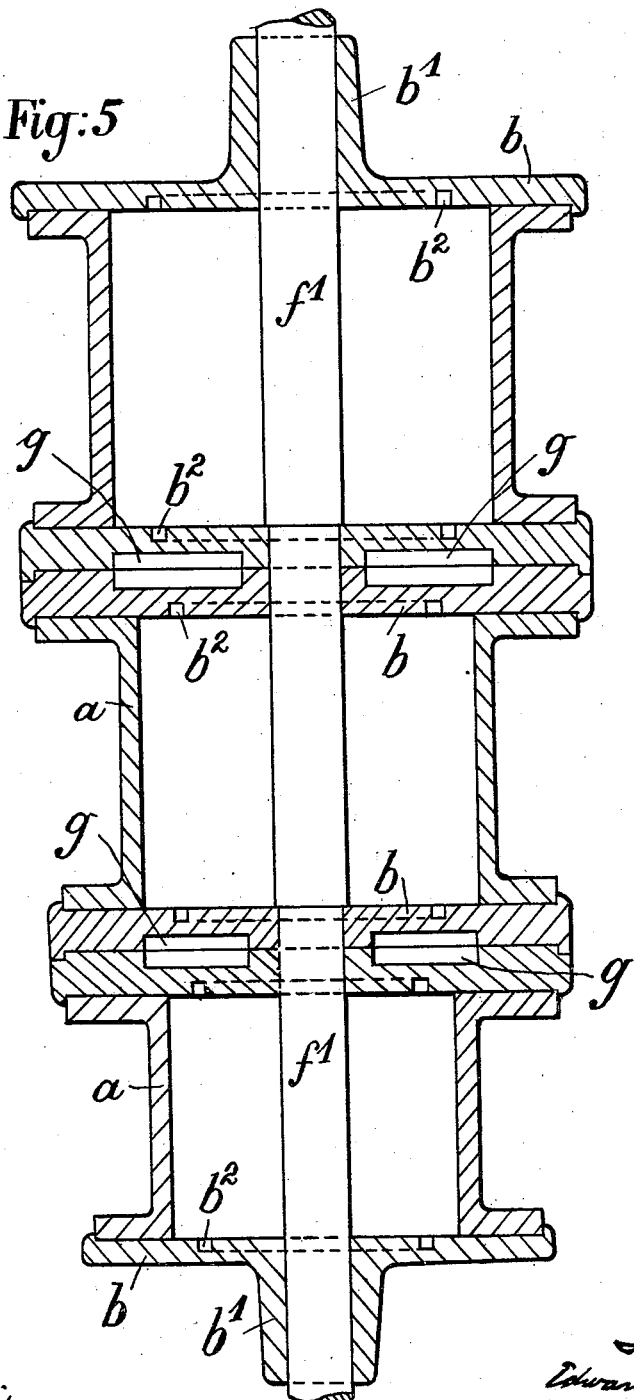

UNITED STATES PATENT OFFICE.

EDWARD TOWLSON, OF CHATTERIS, ENGLAND.

ROTARY MOTOR.

No. 856,317.   Specification of Letters Patent.   Patented June 11, 1907.

Application filed January 2, 1907. Serial No. 350,407.

*To all whom it may concern:*

Be it known that I, EDWARD TOWLSON, a subject of the King of Great Britain, residing at Chatteris, in the county of Cambridge, England, have invented new and useful Improvements in Rotary Fluid-Pressure Motors, Pumps, and Air-Compressors, of which the following is a specification.

The invention relates to rotary fluid pressure motors and pumps having one or more movable abutments, and the object of the invention is to so construct such abutments that they will be perfectly steam-tight and yet will work with a minimum of friction.

The invention is illustrated in the accompanying drawings, in which Figure 1 is a cross section of a rotary fluid pressure motor, pump or air compressor, having an oval piston. Fig. 2 is an external view of the same showing the method of operating the valves. Fig. 3 is a longitudinal section of one of the movable abutments. Fig. 4 is a view to an enlarged scale showing the method of rendering the piston tight at its ends. Fig. 5 is a longitudinal section of three cylinders arranged side by side to act as a triple expansion engine.

The cylinder $a$ is bored out of circular cross section and it has covers $b$ bolted thereto carrying the bearings $b'$ for the rotary piston $c$. This latter is shown of oval form in Fig. 1, but it may be of elliptic, triangular or other form, and fits at points $c'$ the interior of the cylinder $a$. The piston $c$ is formed with grooves $c^2$ in those parts $c'$ which are in contact with the cylinder $a$, each groove $c^2$ having a hard metal strip $c^3$ which is held against the interior of the cylinder $a$ by light flat metal springs $c^4$, thus forming a steam-tight joint.

In the cylinder covers $b$ as shown, or in the ends of the pistons, are formed grooves $b^2$ in which fit rings $b^3$ provided with light flat metal springs $b^4$ to make a steam-tight joint between the ends of the pistons $c$ and the cylinder covers $b$.

The cylinder $a$ is formed with two radial grooves $a'$ opposite to each other when an oval piston $c$ is employed, or three radial grooves when a triangular piston is employed, in each of which is located a hollow roll $d$ held in contact with the rotary piston $c$ by means of a small piston $d'$ in a cylinder $e$ having a steam or other fluid pressure inlet $e'$ at its end. An extra roll may be employed between the first mentioned roll $d$ and the said piston $d'$. This last mentioned piston $d'$ acts as a spring and allows its hollow roll or rolls $d$ to move in and out, one being in contact with the oval piston $c$ as this latter rotates. The hollow rolls $d$ are each closed by a disk $d^2$ at each end and are provided with an internal spring $d^3$ acting to force the disks $d^2$ outward into contact with the heads $b$ of the main cylinder $a$, thus insuring a steam-tight fit at their ends.

The main cylinder $a$ is provided with suitable inlet ports $a^2$ and exhaust ports $a^3$ and inlet valves $a^4$. The inlet valves $a^4$ are operated by the crank $f$ on main shaft $f'$ and connecting rods $f^2$, which latter are connected to rocking arms $f^3$ on the spindles of the inlet valves $a^4$.

The engine may be worked as an expansion engine by employing several cylinders as shown at Fig. 5, the first of which is provided with valves, as shown at Fig. 1, the other cylinders receiving the exhaust steam on the driving sides of the rotary piston. The exhaust ports $a^3$ are always open. The chambers $g$ receive the exhaust steam and have ports, not shown, leading into the next cylinder.

It will be understood that a motor as herein shown and described may be driven by the pressure of exploding gases.

It is only necessary to drive the rotary piston $c$ and to connect up the inlet and outlet ports $a^2$, $a^3$, in a suitable manner as is well understood to use the apparatus as a pump or air compressor.

What I claim is:—

1. In rotary fluid pressure motors, and the like, a movable abutment consisting of a roll located in a groove in the cylinder, a small piston acting to hold the roll in contact with the rotary piston, a cylinder in which such small piston is located, and an inlet in the end of said cylinder to admit steam or other fluid under pressure thereto, substantially as herein set forth.

2. In rotary fluid pressure motors, and the like, a movable abutment consisting of a hollow roll, a disk to close each end of said roll, a spring acting to force the disks outward, a small piston acting to hold said roll in contact with the rotary piston, a cylinder in which such small piston is located, and an inlet in the end of said cylinder to admit steam or other fluid under pressure thereto, substantially as herein set forth.

In witness whereof I have hereunto set my hand in presence of two witnesses.

EDWARD TOWLSON.

Witnesses:
JONATHAN BARBER,
GEORGE HENRY WRIGHT.